(12) United States Patent
Karapetyan et al.

(10) Patent No.: US 10,289,266 B2
(45) Date of Patent: May 14, 2019

(54) PROVIDING DATA VISUALIZATION

(71) Applicant: VMware, Inc., Palo Alto, CA (US)

(72) Inventors: Nina Karapetyan, Yerevan (AM); Artashes Hakobyan, Yerevan (AM)

(73) Assignee: VMware, Inc., Palo Alto, CA (US)

( * ) Notice: Subject to any disclaimer, the term of this patent is extended or adjusted under 35 U.S.C. 154(b) by 105 days.

(21) Appl. No.: 15/655,001

(22) Filed: Jul. 20, 2017

(65) Prior Publication Data
US 2019/0026007 A1    Jan. 24, 2019

(51) Int. Cl.
*G06F 3/0481* (2013.01)
*G06F 9/455* (2018.01)
*H04L 12/24* (2006.01)

(52) U.S. Cl.
CPC ...... *G06F 3/04817* (2013.01); *G06F 9/45558* (2013.01); *H04L 41/044* (2013.01)

(58) Field of Classification Search
CPC .................................................. G06F 3/04817
USPC ......................................................... 715/825
See application file for complete search history.

(56) References Cited

U.S. PATENT DOCUMENTS

| | | | | |
|---|---|---|---|---|
| 5,136,690 | A * | 8/1992 | Becker | H04L 41/12 345/619 |
| 7,890,869 | B1 * | 2/2011 | Mayer | G06F 21/577 709/224 |
| 9,960,974 | B2 * | 5/2018 | Bai | H04L 43/045 |
| 10,122,605 | B2 * | 11/2018 | Kulkarni | H04L 43/0817 |

(Continued)

OTHER PUBLICATIONS

Kanungo et al., "An Efficient k-Means Clustering Algorithm: Analysis and Implementation"; IEEE Transactions on Pattern Analysis and Machine Intelligence, vol. 24, No. 7, Jul. 2002 (12 pgs).

*Primary Examiner* — Reza Nabi
(74) *Attorney, Agent, or Firm* — Clayton, McKay & Bailey, PC

(57) ABSTRACT

The present disclosure is related to methods, systems, and devices for providing data visualization. An example device can include instructions executed to receive information corresponding to a plurality of items, the information including a respective value for a first parameter of each item and a respective value for a second parameter of each item, determine a first visualization of the first parameter and the second parameter of the plurality of items, the first visualization including a first quantity of display elements, each respectively corresponding to a single item of the plurality of items, wherein a first visual property of each display element indicates a respective value of the first parameter of the corresponding item, and wherein a second visual property of each display element indicates a respective value of the second parameter of the corresponding item, and cause the interface to display a second visualization of the first parameter and the second parameter of the plurality of items, the second visualization including a second quantity of display elements, wherein at least one of the second quantity of display elements corresponds to a single item of the plurality of items, and wherein at least one of the second quantity of display elements corresponds to multiple items of the plurality of items.

18 Claims, 5 Drawing Sheets
(1 of 5 Drawing Sheet(s) Filed in Color)

(56) References Cited

U.S. PATENT DOCUMENTS

| | | | | |
|---|---|---|---|---|
| 2004/0037230 A1* | 2/2004 | Kroboth | ................ | G08C 15/06 370/252 |
| 2004/0039542 A1* | 2/2004 | Kroboth | ................ | H04L 43/02 702/127 |
| 2009/0006112 A1* | 1/2009 | White | ................ | G06Q 10/087 705/346 |
| 2014/0280921 A1* | 9/2014 | VanderKoy | ........... | H04L 43/045 709/224 |
| 2015/0156077 A1* | 6/2015 | Gao | ................... | H04L 41/0853 709/223 |
| 2016/0011925 A1* | 1/2016 | Kulkarni | ............ | H04L 43/0817 714/57 |
| 2016/0013990 A1* | 1/2016 | Kulkarni | ................ | H04L 41/22 709/224 |
| 2016/0109495 A1* | 4/2016 | Sterkel | ................ | G06F 17/212 702/62 |
| 2018/0341394 A1* | 11/2018 | Sangli | ................ | G06F 3/04847 |

* cited by examiner

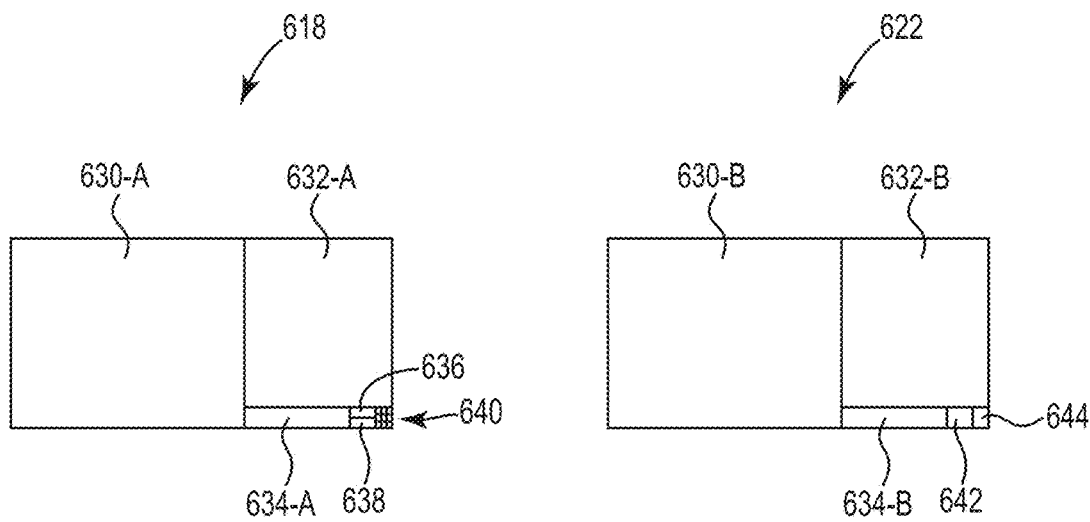

PROVIDING DATA VISUALIZATION

BACKGROUND

Visualizations can be used to display data through the use of display elements having different visual properties. However, the content of a visualization can be limited in some respects by the dimensions and/or resolution of the device used to display it. Therefore, when the amount of data reaches a certain scale, some visualizations may become cluttered and difficult for users to comprehend. Additionally, providing display elements in a visualization of a large amount of data can degrade performance and increase memory usage.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 6A illustrates a portion of a first visualization according to one or more embodiments of the present disclosure.

FIG. 6B illustrates a portion of a second visualization according to one or more embodiments of the present disclosure.

DETAILED DESCRIPTION

Figure 1:
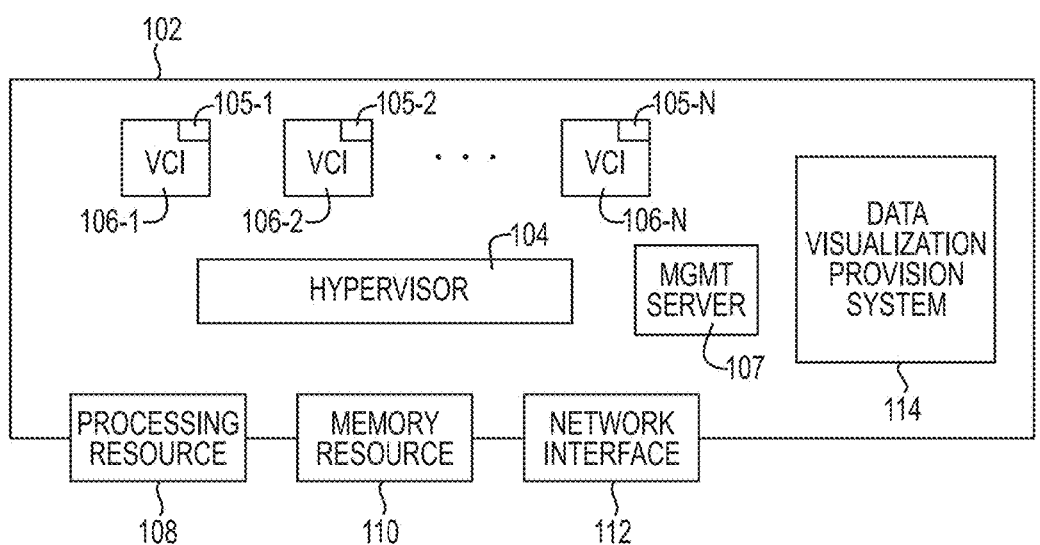
FIG. 1 is a diagram of a host for providing data visualization according to the present disclosure.

Visualizations can be used to display data in a useful manner through the use of display elements having different visual properties. For instance, different data items may be represented in a visualization by display elements that vary in visual properties such as size and/or color. In an example, a value of first parameter of a data item may dictate a size, in a visualization, of a display element corresponding to that data item; in short the larger the value of the parameter, the larger the corresponding display element will be in the visualization.

However, the content of a visualization can be limited in some respects by the dimensions and/or resolution of the device used to display it. Therefore, when the amount of data reaches a certain scale, such visualizations may become cluttered and difficult for users to comprehend. Additionally, providing display elements in a visualization of a large amount of data can degrade performance and increase memory usage.

Data, as referred to herein, includes values for different parameters of a plurality of items. For the purposes of illustration, the present disclosure makes reference to a plurality of virtual computing instances (VCIs) as "items" and discusses displaying the values of one or more parameters of those VCIs in a visualization. Parameters of VCIs can include, for example, disk space usage, central processing unit (CPU) usage, disk bytes read rate, disk bytes transferred rate, disk bytes written rate, network packets sent rate, network packets received rate, etc. It is noted, however, that reference made herein to VCIs is illustrative and is not intended to be taken in a limiting sense. Items, as referred to herein, are things and/or concepts capable of being represented by a display element and have at least one parameter having a determinable value. Items can include entities, components, objects, products, etc.

One example of a visualization may commonly be referred to as a "heat map." In some heat maps, a value of first parameter of a data item may dictate a size of a display element corresponding to that data item. A value of a second parameter of the data item may dictate a color of the display element corresponding to that data item. It is noted that while references to "size" and "color" of display elements are repeatedly made herein, the present disclosure is not limited to these visual properties. A "visual property" refers to a visual characteristic of a display element that provides information regarding the value of the parameter to which it corresponds. In some embodiments, the value can refer to a relative value or an approximate value.

In the VCI context, an example heat map may display a plurality of boxes or rectangles as display elements, each corresponding to a respective VCI. In accordance with the present disclosure, parameters may be selected for display in the visualization. For example, "disk space usage" and "CPU usage" can be selected. Further, the manner in which those parameters are displayed may be selected. For example, the user may desire to view disk space usage as the size of each rectangle, and CPU usage as the color of each rectangle. In some embodiments, such designations may be made automatically (e.g., without user selection). The size of a given rectangle may vary with the value of the respective disk space usage of the corresponding VCI (e.g., low disk space usage represented by a small rectangle, large disk space usage represented by a large rectangle). The color of a given rectangle may range from a first color (e.g., bright green) indicating low CPU usage to a second color (e.g., bright red) indicating high CPU usage. Colors between those extremes (e.g., ranging from dull greens, to browns, to dull reds) can correlate to values that fall in between.

However, when the amount of data reaches a certain scale, such visualizations may become cluttered and difficult for users to comprehend. For instance, for large numbers of VCIs, the difference between the value of the lowest disk space usage of the VCIs and the value of the largest disk space usage of the VCIs may be great. When a rectangle is displayed for each VCI, those having low disk space usage may be rendered so small in the visualization that they become indistinguishable from one another. These issues may be complicated further by the limited size and/or resolution of the display device used to provide the visualization.

Previous approaches to providing visualizations may ignore the motivations and/or purpose underlying the visualization. A visualization depicting VCI disk space usage, for instance, may be desired by a user seeking to readily identify problematic (e.g., high disk-space-using) VCIs so that they can be quickly addressed and corrected. Thus, the user may be interested mainly in the largest rectangles of the visualization and may ignore the smallest as they are not apparently in need of attention. Embodiments of the present disclosure can take this motivation into account and place less emphasis on the provision of display elements for non-problematic VCIs. As a result, where previous approaches may degrade performance and increase memory usage by providing a visualization with a one-to-one correspondence between data items (e.g., VCIs) and display elements (e.g., rectangles), embodiments of the present disclosure can determine which of the items are "non-significant" and display them differently.

In some embodiments, for instance, the visualization can be modified such that a display element corresponds to more than one item. In some embodiments, a display element can correspond to a plurality of items having similar characteristics, and the color of that display element can be representative of the respective colors of the plurality of items corresponding thereto. In some embodiments, a quantity of display elements can be reduced to a number, dictated by the display device, which is the number (e.g., the maximum number) of display elements the display device can render sufficiently clear for visualization. Embodiments herein can use k-means clustering to combine multiple similar items into single display elements. K-means clustering can be used to determine a set of k points among n data points in real d-dimensional space $R^d$, typically referred to as "centers," so as to minimize the mean squared distance from each data point to its nearest center.

VCIs, as referred to herein, cover a range of computing functionality. VCIs may include virtual machines (VMs), and/or containers. A VM refers generally to an isolated end user space instance, which can be executed within a virtualized environment. Other technologies aside from hardware virtualization can provide isolated end user space instances may also be referred to as VCIs. The term "VCI" covers these examples and combinations of different types of VCIs, among others. VMs, in some embodiments, operate with their own guest operating systems on a host using resources of the host virtualized by virtualization software (e.g., a hypervisor, virtual machine monitor, etc.).

Multiple VCIs can be configured to be in communication with each other in a software defined data center. In such a system, information can be propagated from an end user to at least one of the VCIs in the system, between VCIs in the system, and/or between at least one of the VCIs in the system and a management server. Software defined data centers are dynamic in nature. For example, VCIs and/or various application services, may be created, used, moved, or destroyed within the software defined data center. When VCIs are created, various processes and/or services start running and consuming resources. As used herein, "resources" are physical or virtual components that have a finite availability within a computer or software defined data center. For example, resources include processing resources, memory resources, electrical power, and/or input/output resources.

The present disclosure is not limited to particular devices or methods, which may vary. The terminology used herein is for the purpose of describing particular embodiments, and is not intended to be limiting. As used herein, the singular forms "a", "an", and "the" include singular and plural referents unless the content clearly dictates otherwise. Furthermore, the words "can" and "may" are used throughout this application in a permissive sense (i.e., having the potential to, being able to), not in a mandatory sense (i.e., must). The term "include," and derivations thereof, mean "including, but not limited to."

The figures herein follow a numbering convention in which the first digit or digits correspond to the drawing figure number and the remaining digits identify an element or component in the drawing. Similar elements or components between different figures may be identified by the use of similar digits. For example, 102 may reference element "02" in FIG. 1, and a similar element may be referenced as 202 in FIG. 2. A group or plurality of similar elements or components may generally be referred to herein with a single element number. For example a plurality of reference elements 104-1, 104-2, . . . , 104-N may be referred to generally as 104. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present disclosure, and should not be taken in a limiting sense.

FIG. 1 is a diagram of a host for providing data visualization according to the present disclosure. The host 108 can include processing resources 112 (e.g., a number of processors), memory resources 114, and/or a network interface 116. Memory resources 114 can include volatile and/or non-volatile memory. Volatile memory can include memory that depends upon power to store information, such as various types of dynamic random access memory (DRAM) among others. Non-volatile memory can include memory that does not depend upon power to store information. Examples of non-volatile memory can include solid state media such as flash memory, electrically erasable programmable read-only memory (EEPROM), phase change random access memory (PCRAM), magnetic memory, optical memory, and/or a solid state drive (SSD), etc., as well as other types of machine-readable media. For example, the memory resources 114 may comprise primary and/or secondary storage.

The host 108 can be included in a software defined data center. A software defined data center can extend virtualization concepts such as abstraction, pooling, and automation to data center resources and services to provide information technology as a service (ITaaS). In a software defined data center, infrastructure, such as networking, processing, and security, can be virtualized and delivered as a service. A software defined data center can include software defined networking and/or software defined storage. In some embodiments, components of a software defined data center can be provisioned, operated, and/or managed through an application programming interface (API).

The host 108 can incorporate a hypervisor 110 that can execute a number of VCIs 104-1, 104-2, . . . , 104-N. The VCIs 104 can be provisioned with processing resources 112 and/or memory resources 114 and can communicate via the network interface 116. The processing resources 112 and the memory resources 114 provisioned to the servers 104 can be local and/or remote to the host 108. For example, in a software defined data center, the VCIs 104 can be provisioned with resources that are generally available to the software defined data center and are not tied to any particular hardware device. By way of example, the memory resources 114 can include volatile and/or non-volatile memory available to the VCIs 104. The VCIs 104 can be moved to different hosts (not specifically illustrated), such that different hypervisors manage the VCIs 104. In some embodiments, a VCI among the number of VCIs can be a master VCI. For example, VCI 104-1 can be a master VCI, and VCI 104-2, . . . , 104-N can be slave VCI. In some embodiments, each VCI 104 can include a respective agent 105-1, 105-2, . . . , 105-N deployed thereon. The host 102 can be in communication with an analysis of anomalous resource usage system 114. In some embodiments, each VCI 106 can include a respective monitoring agent 105-1, 105-2, . . . , 105-N (referred to generally herein as monitoring agents 105) deployed thereon.

In some embodiments, a system including the data visualization provision system 114 can be in communication with a management server 107 (MGMT SERVER 107) configured to allocate resources to the plurality of VCIs 106, monitor the resources allocated to the VCIs, and provide visualizations in accordance with embodiments herein. In some embodiments, the data visualization provision system 114 can be deployed on (e.g., may be running on) the management server 107, the agents 105, or a combination thereof. In some embodiments, the management server 107 can be configured to dynamically allocate resources to the plurality of VCIs 106. For example, the management server 107 can be configured to modify resources that are allocated to the plurality of VCIs 106 in real time to provide resources from a pool of computing resources.

Figure 2:
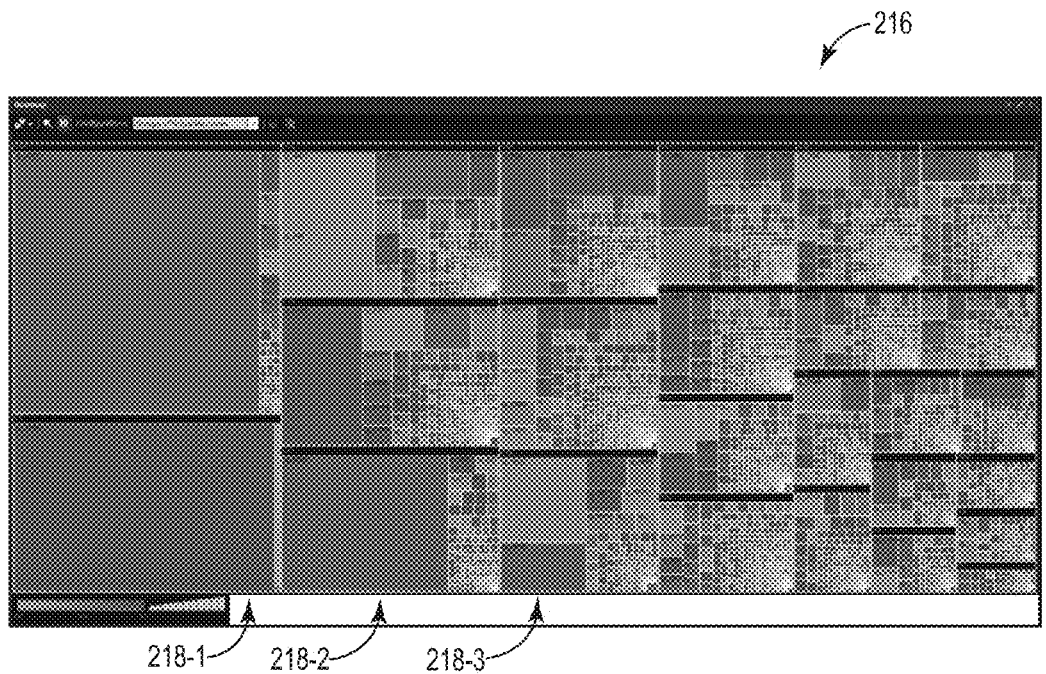
FIG. 2 illustrates a visualization of a plurality of VCIs provided using previous approaches.

FIG. 2 illustrates a visualization 216 of a plurality of VCIs provided using previous approaches. As shown in FIG. 2, the visualization 216 includes a plurality of rectangles. Each of the rectangles shown in FIG. 2 corresponds to a respective VCI. The size of a given rectangle indicates a value of a disk space usage of that VCI and the color of the rectangle indicates a value of a CPU usage of that VCI. For purposes of clarity, each of the rectangles is separated from its adjacent rectangles by a white border. As shown, the rectangles are organized according to logical groups (sometimes referred to herein as simply "groups"); for example, FIG. 2 illustrates a group 218-1, a group 218-2, and a group 218-3. Other groups are present in the visualization 216 but are not specifically referenced. Logical groups, as referred to herein, are groupings of items (VCIs, in the case of FIG. 2). Items may be grouped according to one or more criteria. For example, items may be grouped by type, location, time, etc. The VCIs in FIG. 2 may be grouped according to the cluster to which they belong, for instance. As seen in FIG. 2, and as previously discussed, some VCIs have disk space usages with such a low value as to become virtually invisible in the visualization 216. As seen in the group 218-2, for instance, many of the rectangles therein are of such small size that the white border surrounding them actually dominates a portion of the group 218-2.

Figure 3:
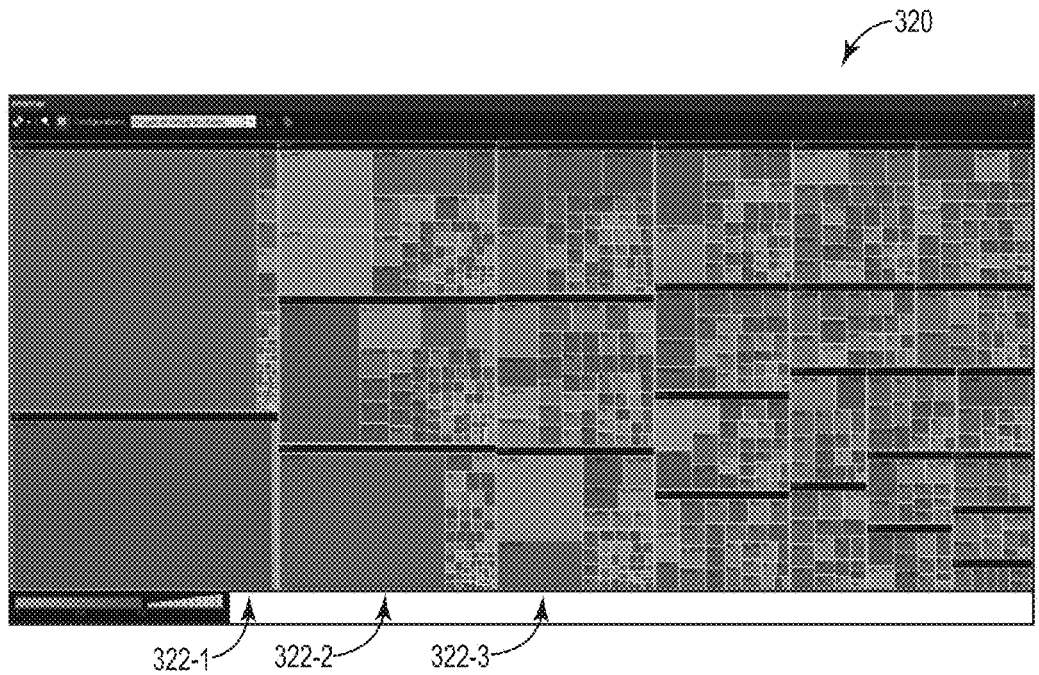
FIG. 3 illustrates a visualization of the plurality of VCIs illustrated in FIG. 2 provided according to the present disclosure.

FIG. 3 illustrates a visualization 320 of the plurality of VCIs illustrated in FIG. 2 provided according to the present disclosure. In a manner analogous to the visualization 216, the visualization 320 includes a plurality of rectangles. For some of the rectangles shown in FIG. 3, the rectangle corresponds to a respective VCI. As discussed further below, for others, more than one VCI is corresponds to a single rectangle. As shown, the rectangles are organized according to logical groups; for example, FIG. 3 illustrates a group 322-1, a group 322-2, and a group 322-3. Other groups are present in the visualization 320 but are not specifically referenced. For a portion of the VCIs depicted in the visualization 320, the size of a given rectangle indicates a value of a disk space usage of that VCI and the color of the rectangle indicates a value of a CPU usage of that VCI. However, in contrast with the visualization 216, discussed above, some of the rectangles correspond to more than one VCI. As discussed in more detail below, a plurality of rectangles of a size below a size threshold can be consolidated into a single rectangle. By so doing, embodiments herein can provide the visualization 320 with less noise, less latency and with less memory usage than previous approaches that provide the visualization 216, illustrated in FIG. 2. The visualization 320 can allow users to quickly focus on what they perceive to be the most "important" items of the very large number of items. Accordingly, users can better control the performance of those items.

Figure 4:
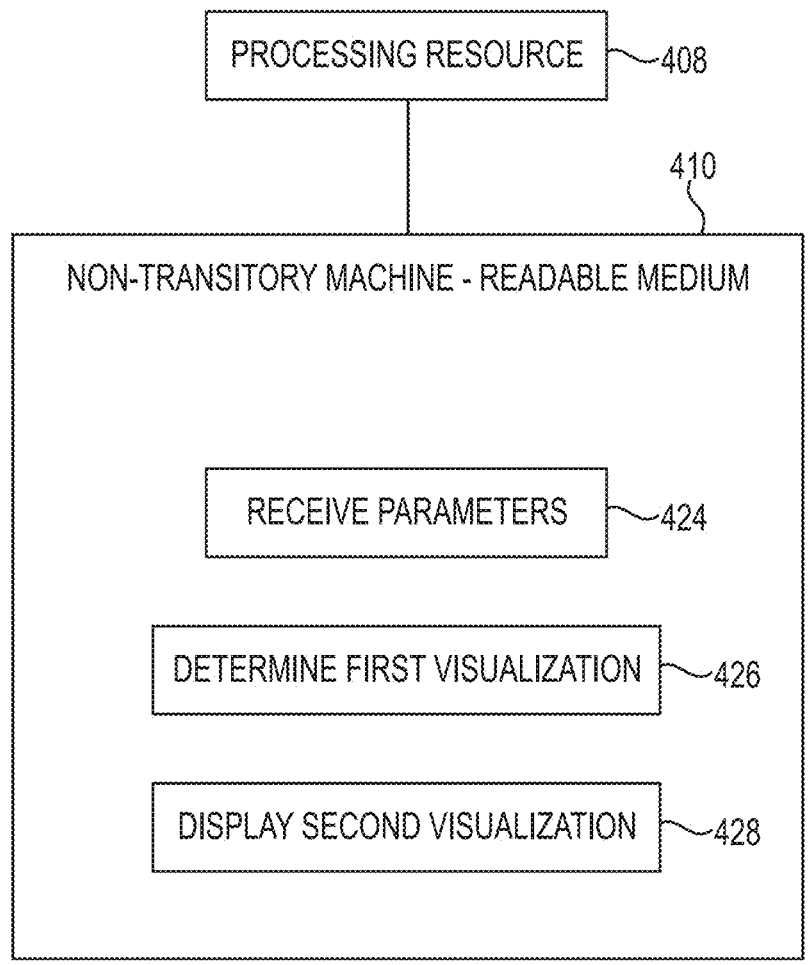
FIG. 4 illustrates a diagram of a non-transitory machine-readable medium for providing data visualization according to the present disclosure.

FIG. 4 illustrates a diagram of a non-transitory machine-readable medium for providing data visualization according to the present disclosure. The medium 410 can be part of a machine that includes a processing resource 408. The processing resource 408 can be configured to execute instructions stored on the non-transitory machine readable medium 410. For example, the non-transitory machine readable medium 410 can be any type of volatile and/or non-volatile memory.

The processing resource 408 can be coupled to the medium 410 via a communication path. The communication path can be local or remote to the machine. Examples of a local communication path can include an electronic bus internal to a machine, where the medium 410 is in communication with the processing resource 408 via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof. The communication path can be such that the medium 410 is remote from the processing resource 408, such as in a network connection between the medium 410 and the processing resource 408. That is, the communication path can be a network connection. Examples of such a network connection can include a local area network (LAN), wide area network (WAN), personal area network (PAN), and the Internet, among others.

The medium 410 can be internal and/or external to the machine (e.g., the machine can include internal memory resources and have access to external memory resources). The program instructions (e.g., machine-readable instructions (MRI)) can include instructions stored on the MRM to implement a particular function. The set of MRI can be executable by one or more of the processing resources 408. The medium 410 can be coupled to the processing resources 408 in a wired and/or wireless manner. For example, the medium 410 can be an internal memory, a portable memory, a portable disk, and/or a memory associated with another resource, e.g., enabling MM to be transferred and/or executed across a network such as the Internet.

The medium 410 can store instructions 424 executable by the processing resource 408 to receive information corresponding to a plurality of items, the information including a respective value for a first parameter of each item and a respective value for a second parameter of each item. As previously discussed, in some embodiments, the items can be VCIs. In the example of VCIs, the first and second parameters can be selected from a group including, but not limited to, disk space usage, central processing unit (CPU) usage, disk bytes read rate, disk bytes transferred rate, disk bytes written rate, network packets sent rate, and network packets received rate.

The medium 410 can store instructions 426 executable by the processing resource 408 to determine a first visualization of the first parameter and the second parameter of the plurality of items, the first visualization including a first quantity of display elements, each respectively corresponding to a single item of the plurality of items. In some embodiments, the first visualization can be displayed. In some embodiments, for instance, the first visualization may resemble the visualization 216, previously discussed in connection with FIG. 2. A first visual property of each display element in the first visualization can indicate a respective value of the first parameter of the corresponding item, and a second visual property of each display element can indicate a respective value of the second parameter of the corresponding item. In some embodiments, the first and second visual properties can be size and color. However, it is noted that embodiments herein are not so limited. For instance, visual properties can include textures, stippling, cross hatching, shapes, borders, etc.

The medium 410 can store instructions 428 executable by the processing resource 408 to cause the interface to display a second visualization of the first parameter and the second parameter of the plurality of items, the second visualization including a second quantity of display elements, wherein at least one of the second quantity of display elements corresponds to a single item of the plurality of items, and wherein at least one of the second quantity of display elements corresponds to multiple items of the plurality of items. In some embodiments, the second visualization can be displayed responsive to a selection and/or input made using the interface. For example, in some embodiments, the first visualization can be displayed and the user can indicate that the second visualization is desired (e.g., based on a large amount of noise present in the first visualization).

The differences between the second visualization and the first visualization can, to some extent, be seen in the difference between the visualization 320 and the visualization 216, previously discussed. For example, the second visualization can generally include fewer display elements than the first visualization. The second visualization can exhibit reduced noise. Display elements of the second visualization can each have a size larger than a particular size threshold. The second visualization can allow a user to more quickly focus on what they may consider to be the "important" display elements, which may include elements having a threshold-exceeding value for the first and/or second parameters. Referring back to FIG. 3, a user may consider the largest rectangle in the group 322-1 to be of particular importance as its large size indicates a high disk space usage and its red coloration indicates a high CPU usage.

Displaying the second interface can include a number of determinations. For instance, a determination can be made regarding a configuration of the interface. The configuration can refer to a number (e.g., a maximum number) of display elements the interface (e.g., display device) can render sufficiently clear for visualization. The configuration can refer to a maximum number of display elements that the interface is configured to display at a particular resolution. This number of elements and, accordingly, their size (e.g., smallest size) can be dictated by the size of the interface and/or the resolution of the interface, for instance.

Figure 5:
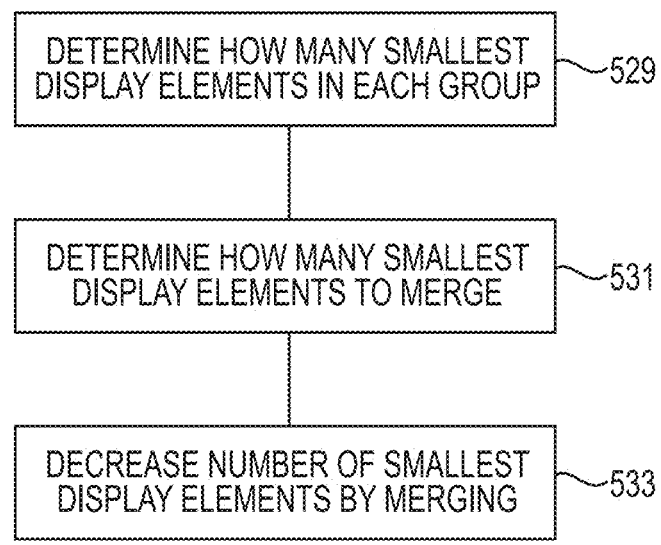
FIG. 5 illustrates a flow chart associated with providing data visualization according to the present disclosure

FIG. 5 illustrates a flow chart associated with providing data visualization according to the present disclosure. At 529, embodiments herein can include determining how many of the "smallest display elements" are to be displayed in each group. Assume, for instance, that n represents the number of smallest display elements that can be clearly rendered, x represents a number of groups of display elements in the visualization, $\{g_1, \ldots, g_x\}$ represent the different sizes of the groups of display elements. Then, the total size of the visualization, G, can be determined by: $G=g_1+ \ldots +g_x$. The number of smallest display elements, m, in a group, i, can be determined by: $m_i=g_i*n/G$.

At 531, embodiments herein can include determining how many smallest display elements to merge into larger, easier to visualize, display elements (e.g., display elements that are to represent more than one item). These display elements may be referred to herein as "combination display elements." Assume, for instance, that y represents a number of display elements in the group i, and that $\{t_i, \ldots, t_y\}$ represents the respective sizes of the display elements in group i. Then, the number of smallest display elements in a combination display element j can be determined by: $k_j=t_j*m_i/g_i$.

At 533, if a determination is made that the quantity of smallest display elements in $t_i$ is less than $k_j$, embodiments herein can reduce the quantity of smallest display elements in $t_i$ (by merging) such that the quantity is less than or equal to k. Embodiments herein can reduce the quantity of smallest display elements by merging similar display elements into combination display elements and dividing the groups into differentiated subgroups. Embodiments herein can determine the similarity of display elements and what display elements to merge. As previously discussed, display elements can be described by size and color, in some embodiments. Each of these parameters can be given equal weight. Embodiments herein can merge the smallest display elements into the combination display element(s) using k-means++ clustering (e.g., if the quantity of smallest display elements in $t_i$ is less than $k_j$, reduce the quantity of smallest display elements in $t_i$ such that the quantity is less than or equal to k). In some embodiments, each cluster size (e.g., each combination display element size) can be the sum of the sizes of the smallest display elements included in the cluster. In some embodiments, the color of a particular cluster (e.g., combination display element) can be a color representative of the respective colors of the smallest display elements merged therein (e.g., an average of the colors of the smallest display elements). In some embodiments, the color of a particular cluster can be a color corresponding to an average value of the respective values of the color parameter of the smallest display elements merged therein.

FIG. 6A illustrates a portion of a first visualization according to one or more embodiments of the present disclosure. FIG. 6B illustrates a portion of a second visualization according to one or more embodiments of the present disclosure. The portion 618 can be, for instance, a portion of a first visualization corresponding to a group of items. The portion 622 can be, for instance, a portion of a second visualization corresponding to the group of items.

The first visualization 618 includes a display element 630-A, a display element 632-A, a display element 634-A, a display element 636, a display element 638, and a set of display elements 640. As previously discussed, smaller display elements may be difficult for users to readily comprehend and may, in some cases, be of reduced importance to those users. These smaller display elements can include the display element 636, the display element 638, and the set of display elements 640, for instance.

The second visualization 622 includes a display element 630-B, which may be similar in appearance to the display element 630-A; a display element 632-B, which may be similar in appearance to the display element 632-A; and a display element 634-B, which may be similar in appearance to the display element 634-A. As shown in FIG. 6B, however, the display elements 636 and 638 have been merged into a combination display element 642, and the set of display elements 640 has been merged into a combination display element 644.

While the second visualization 622 may exhibit less noise and clutter than the first visualization 618, the information therein can still be provided. For instance, selection of the display element 642 may provide a display of detailed information corresponding to the display elements 636 and 638 that were merged therein. Such information can include, for instance, values of the parameters shown by either the first visualization 618 or the second visualization 622. Similarly, selection of the display element 644 may provide a display of information corresponding to each of the set of display elements 640. Similarly, selection of any of the display elements 630-B, 632-B, and 634-B can cause display of information associated with the items respectively corresponding thereto. In some embodiments, a third visualization (e.g., display) can be provided responsive to a request. In some embodiments, the request can be a zoom request. For instance, a request can target or select one of the display elements 642 or 644. The third display can "zoom" in on the selected element for further details. In some embodiments, the third display can include combination display elements that include more than one item merged therein. In some embodiments, a fourth display can be provided responsive to a zoom request targeting a combination display element of the third display. In some embodiments, the fourth display can include display elements having a one-to-one correlation with items. Accordingly, a user can sequentially drill-down into smaller and smaller display elements to reveal the information underlying the visualization.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A non-transitory machine-readable medium having instructions stored thereon which, when executed by a processor, cause the processor to:
   receive information corresponding to a plurality of items, the information including a respective value for a first parameter of each item and a respective value for a second parameter of each item;
   determine a first visualization of the first parameter and the second parameter of the plurality of items, the first visualization including a first quantity of display elements, each respectively corresponding to a single item of the plurality of items,
      wherein a first visual property of each display element indicates a respective value of the first parameter of the corresponding item, and
      wherein a second visual property of each display element indicates a respective value of the second parameter of the corresponding item; and
   cause the interface to display a second visualization of the first parameter and the second parameter of the plurality of items, the second visualization including a second plurality of display elements,
      wherein at least one of the second quantity of display elements corresponds to a single item of the plurality of items,
      wherein at least one of the second quantity of display elements corresponds to multiple items of the plurality of items, and
      wherein the first visual property is size that changes based on the respective value of the first parameter and the second visual property is color that changes based on the respective value of the second parameter.

2. The medium of claim 1, including instructions to cause the interface to display the second visualization responsive to an input made using the interface.

3. The medium of claim 1, wherein the second quantity is less than the first quantity.

4. The medium of claim 1, wherein the information corresponding to the plurality of items includes logical groupings of the plurality of items,
   the medium further including instructions to cause the interface to display groupings of the second quantity of display elements corresponding to the logical groupings of the plurality of items.

5. The medium of claim 4, including instructions to determine the second quantity of display elements based on:
   a quantity of the logical groupings; and
   a size, in the second visualization, of each of the logical groupings of the second quantity of display elements.

6. The medium of claim 1, including instructions to apply a k-means clustering algorithm to determine a particular quantity of the multiple items of the plurality of items.

7. A system for providing data visualization, comprising:
   a processing resource; and
   a memory resource configured to store instructions which, when executed by the processing resource, cause the processing resource to:
      receive information corresponding to a plurality of items, the information including a respective value for a first parameter of each item and a respective value for a second parameter of each item;
      determine a first visualization of the first parameter and the second parameter of the plurality of items, the first visualization including a first quantity of display elements, each respectively corresponding to a single item of the plurality of items,
         wherein a first visual property of each display element indicates a respective value of the first parameter of the corresponding item, and
         wherein a second visual property of each display element indicates a respective value of the second parameter of the corresponding item; and
      cause the interface to display a second visualization of the first parameter and the second parameter of the plurality of items, the second visualization including a second plurality of display elements,
         wherein at least one of the second quantity of display elements corresponds to a single item of the plurality of items,
         wherein at least one of the second quantity of display elements corresponds to multiple items of the plurality of items, and
         wherein the first visual property is size that changes based on the respective value of the first parameter and the second visual property is color that changes based on the respective value of the second parameter.

8. The system of claim 7, the processing resource further causing the interface to display the second visualization responsive to an input made using the interface.

9. The system of claim 7, wherein the second quantity is less than the first quantity.

10. The system of claim 7, wherein the information corresponding to the plurality of items includes logical groupings of the plurality of items,
the processing resource further causing the interface to display groupings of the second quantity of display elements corresponding to the logical groupings of the plurality of items.

11. The system of claim 10, the processing resource further determining the second quantity of display elements based on:
a quantity of the logical groupings; and
a size, in the second visualization, of each of the logical groupings of the second quantity of display elements.

12. The system of claim 7, the processing resource applying a k-means clustering algorithm to determine a particular quantity of the multiple items of the plurality of items.

13. A method for providing data visualization, comprising:
receive information corresponding to a plurality of items, the information including a respective value for a first parameter of each item and a respective value for a second parameter of each item;
determine a first visualization of the first parameter and the second parameter of the plurality of items, the first visualization including a first quantity of display elements, each respectively corresponding to a single item of the plurality of items,
wherein a first visual property of each display element indicates a respective value of the first parameter of the corresponding item, and
wherein a second visual property of each display element indicates a respective value of the second parameter of the corresponding item; and
cause the interface to display a second visualization of the first parameter and the second parameter of the plurality of items, the second visualization including a second plurality of display elements,
wherein at least one of the second quantity of display elements corresponds to a single item of the plurality of items,
wherein at least one of the second quantity of display elements corresponds to multiple items of the plurality of items, and
wherein the first visual property is size that changes based on the respective value of the first parameter and the second visual property is color that changes based on the respective value of the second parameter.

14. The method of claim 13, further comprising causing the interface to display the second visualization responsive to an input made using the interface.

15. The method of claim 13, wherein the second quantity is less than the first quantity.

16. The method of claim 13, wherein the information corresponding to the plurality of items includes logical groupings of the plurality of items, and
wherein the method further includes causing the interface to display groupings of the second quantity of display elements corresponding to the logical groupings of the plurality of items.

17. The method of claim 16, further comprising determining the second quantity of display elements based on:
a quantity of the logical groupings; and
a size, in the second visualization, of each of the logical groupings of the second quantity of display elements.

18. The method of claim 13, further comprising applying a k-means clustering algorithm to determine a particular quantity of the multiple items of the plurality of items.

* * * * *